(12) United States Patent
Aoyagi

(10) Patent No.: US 7,289,293 B2
(45) Date of Patent: Oct. 30, 2007

(54) PERPENDICULAR RECORDING MAGNETIC DISK APPARATUS

(75) Inventor: Yuka Aoyagi, Tachikawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 422 days.

(21) Appl. No.: 10/992,850

(22) Filed: Nov. 22, 2004

(65) Prior Publication Data
US 2005/0117247 A1 Jun. 2, 2005

(30) Foreign Application Priority Data
Nov. 28, 2003 (JP) ............... 2003-400793

(51) Int. Cl.
G11B 5/012 (2006.01)
G11B 5/82 (2006.01)

(52) U.S. Cl. .................. 360/97.01; 360/135; 360/126

(58) Field of Classification Search ................ 360/126, 360/135, 97.01; 428/427, 428, 428.1
See application file for complete search history.

(56) References Cited

U.S. PATENT DOCUMENTS 5,854,727 A 12/1998 Tanaka et al.

2001/0017746 A1 8/2001 Nishida et al.
2001/0038932 A1* 11/2001 Uwazumi et al. ...... 428/694 TS
2003/0021063 A1 1/2003 Kuroda et al.
2003/0099869 A1* 5/2003 Oikawa et al. ...... 428/694 TM

FOREIGN PATENT DOCUMENTS

| JP | 2003-109201 | | 4/2003 |
| JP | 2003-162807 | | 6/2003 |
| JP | 2003162806 A | * | 6/2003 |
| JP | 2003187413 A | * | 7/2003 |

OTHER PUBLICATIONS

Austrian Search Report dated Nov. 9, 2006 for Appln. No. 200407069-4.

* cited by examiner

Primary Examiner—William J Klimowicz
(74) Attorney, Agent, or Firm—Pillsbury Winthrop Shaw Pittman, LLP

(57) ABSTRACT

A perpendicular recording magnetic disk apparatus has a perpendicular two-layered medium including a pinning layer, a soft underlayer and a perpendicular recording layer, and a write head including a main pole, a return yoke and an exciting coil. In this apparatus, a magnetization recoverable magnetic field $H_{exf}$ by which the pinning layer and the soft underlayer ensure a magnetization recovery ratio of 1 is larger than a magnetic field applied by the write head to the pinning layer.

4 Claims, 5 Drawing Sheets

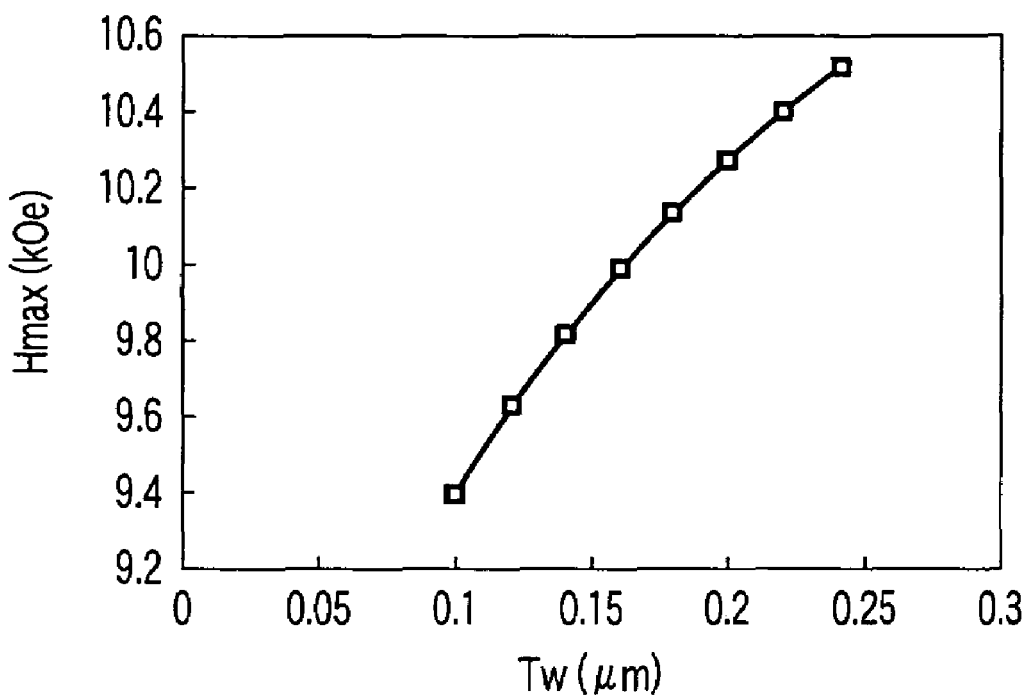
F I G. 3A
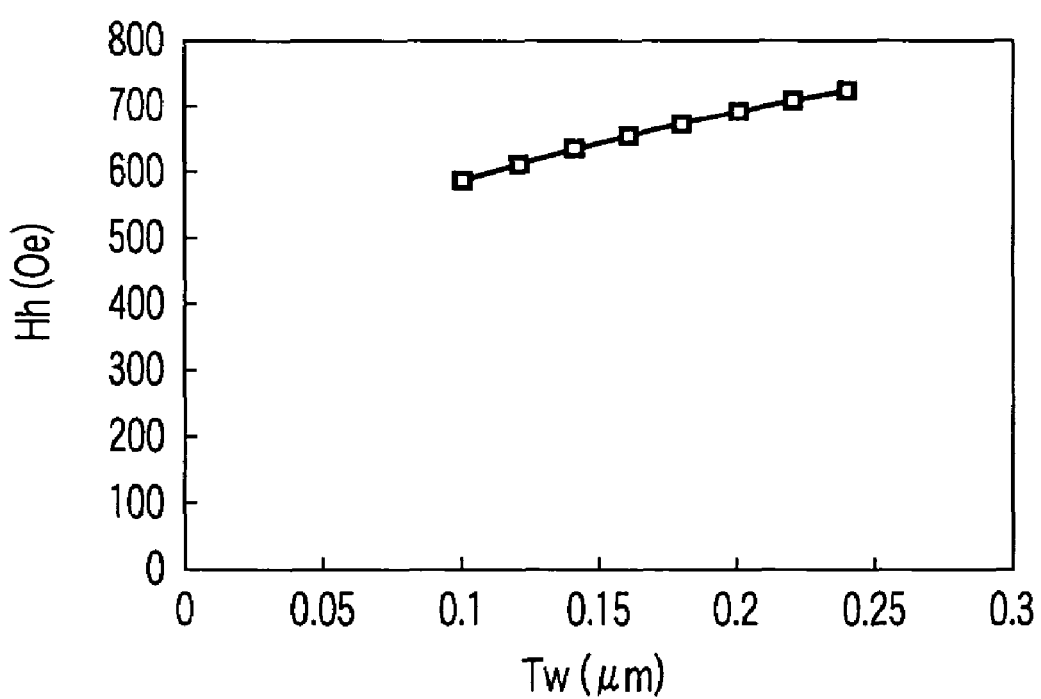
F I G. 3B

PERPENDICULAR RECORDING MAGNETIC DISK APPARATUS

CROSS-REFERENCE TO RELATED APPLICATIONS

This application is based upon and claims the benefit of priority from prior Japanese Patent Application No. 2003-400793, filed Nov. 28, 2003, the entire contents of which are incorporated herein by reference.

BACKGROUND OF THE INVENTION

1. Field of the Invention

The present invention relates to a perpendicular recording magnetic disk apparatus.

2. Description of the Related Art

A perpendicular recording magnetic disk apparatus presently being developed uses a method in which writing to a so-called perpendicular two-layered medium having a soft underlayer (SUL) and a perpendicular recording layer is performed by using a single-pole head. In this perpendicular recording magnetic disk apparatus, data is written in the perpendicular recording layer by employing the magnetic coupling between the single-pole head and the soft underlayer, i.e., the magnetic flux which flows from a main pole to a return yoke through the soft underlayer. From the standpoint of signal quality, it is important that the magnetization in the soft underlayer be stable.

One requirement for the perpendicular recording magnetic disk apparatus is little medium noise. More specifically, it is desirable that no spike noise be produced, colored wideband noise be little as a whole, and the frequency characteristics be small. However, since the coercivity Hc of the soft underlayer is small, it often forms magnetic walls under the influence of a magnetic field. When the head passes over a magnetic wall, spike noise is produced in the read signal. Therefore, it is desired that magnetic walls rarely be formed in the soft underlayer. To achieve this object, a structure is used which fixes the magnetization in the soft underlayer in a predetermined orientation by forming below the soft underlayer a pinning layer made of, e.g., a hard magnetic material.

Conventionally, a medium in which magnetic walls are rarely formed even when a magnetic field is applied to the soft underlayer has been proposed (Jpn. Pat. Appln. KOKAI Publication No. 2003-109201). In this reference, on the basis of an M-H curve in the in-plane direction of the soft underlayer, the intersection of a straight line connecting a point (Hs, Ms) at which magnetization saturates in the first quadrant and a positive intersection (0, Mr) of the M-H curve and the ordinate, and a tangent at a negative intersection (-Hc, 0) of the M-H curve and the abscissa is obtained, and an absolute value Hn of a magnetic field at this intersection is used as a parameter. In this perpendicular recording medium, the maximum magnetic field applied longitudinally to the magnetic recording medium is smaller than the magnetic field Hn. Therefore, the magnetization of the soft underlayer varies with retaining the value of the saturation magnetization, and the M-H curve does not form a minor loop. This makes it possible to keep the magnetizations oriented in the same direction by the exchange coupling interaction between the soft underlayer and pinning layer.

If the exchange coupling between the pinning layer and the soft underlayer is too strong, the magnetization in the pinning layer may reverse together with the magnetization in the soft underlayer when a magnetic field is applied. Accordingly, a proposal which suppresses magnetization deviation in the soft underlayer by appropriately weakening the exchange coupling force between the pinning layer and the soft underlayer is also known (Jpn. Pat. Appln. KOKAI Publication No. 2003-162807). More specifically, in a magnetic recording medium in which an in-plane hard underlayer, an intermediate layer, an in-plane soft underlayer and a magnetic recording layer are stacked on a substrate, the intermediate layer is formed of a material selected from the group consisting of a magnetic layer having saturation magnetization smaller than that of the in-plane hard underlayer, a nonmagnetic layer having a thickness of 0.5 nm or less and an oxide layer of the in-plane hard underlayer.

A cause that makes the magnetization of the soft underlayer in the perpendicular two-layered medium deviate from a predetermined direction includes the magnetic field applied by the write head to the pinning layer. To obtain a high write performance, a head magnetic field in the center of the recording layer must be strengthened. However, when this head magnetic field becomes strong, the magnetic field applied to the pinning layer also becomes strong. If the magnetic field from the write head is too strong, therefore, magnetization deviation may occur in the soft underlayer.

When the manufacturability of the medium is taken into account, a thinner soft underlayer is presumably more preferable because the uniformity of the soft underlayer can be increased and dust can be reduced. Although the thickness of a conventional soft underlayer is 200 to 250 nm, the aimed thickness for the future is preferably 150 nm or less, and more preferably, 100 nm or less. When the soft underlayer is thus made thinner, the field strength applied by the write head to the pinning layer increases further, and the magnetization in the soft underlayer may easily deviate. Unfortunately, a design criterion of a perpendicular recording disk apparatus for preventing magnetization deviation in the soft underlayer has yet to be established.

BRIEF SUMMARY OF THE INVENTION

A perpendicular recording magnetic disk apparatus according to embodiments of the present invention comprises: a perpendicular two-layered medium comprising a pinning layer, a soft underlayer and a perpendicular recording layer; and a write head comprising a main pole, a return yoke and an exciting coil, a magnetization recoverable magnetic field $H_{exf}$ by which the pinning layer and the soft underlayer ensure a magnetization recovery ratio of 1 being larger than a magnetic field applied by the write head to the pinning layer.

In the perpendicular recording magnetic disk apparatus according to the embodiments of the present invention, if $T_w$ is a track width (in μm) of the main pole, PT is a dimension (in μm) in the head tracking direction of the main pole, B (T) is a saturation flux density and t is a thickness (in nm) of the soft underlayer, the magnetization recoverable magnetic field $H_{exf}$ satisfies a relationship represented by the following formula:

$$H_{exf} > (((0.264*\log(t)+2.77)*B-0.09)*\exp(3.48*PT*T_w))*(201*\exp(-0.014*t)).$$

BRIEF DESCRIPTION OF THE SEVERAL VIEWS OF THE DRAWING

FIG. 3A is a graph showing the relationship between the track width $T_w$ of the main pole of the magnetic head and the magnetic field $H_{max}$ applied to the center of the recording layer;

FIG. 3B is a graph showing the relationship between the track width $T_w$ of the main pole and the in-plane magnetic field $H_h$ applied to the pinning layer;

DETAILED DESCRIPTION OF THE INVENTION

Embodiments of the present invention will be described below with reference to the accompanying drawings.

Figure 1:
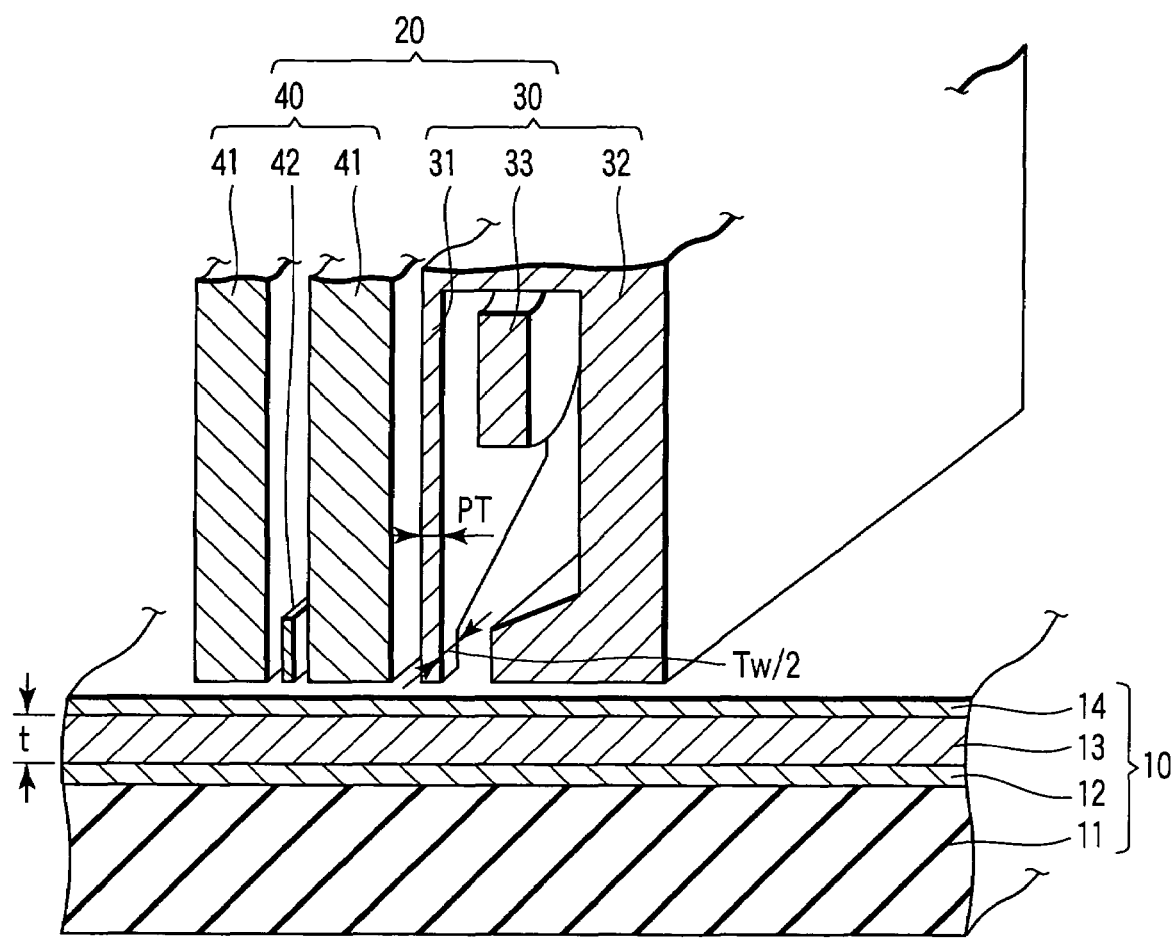
FIG. 1 is a perspective view showing a magnetic disk and a magnetic head of a perpendicular magnetic disk apparatus according to an embodiment of the present invention.

FIG. 1 is a perspective view showing a magnetic disk and a magnetic head of a perpendicular magnetic disk apparatus according to an embodiment of the present invention. Referring to FIG. 1, the magnetic head is depicted by its section taken along a plane passing through the center of a main pole along the track direction. As shown in FIG. 1, a magnetic disk 10 has a structure in which a pinning layer 12 made of a hard magnetic material, a soft underlayer 13 and a perpendicular recording layer 14 made of a magnetic material having perpendicular anisotropy are stacked on a substrate 11. A magnetic head 20 includes a write head 30 and read head 40. The write head 30 includes a main pole 31, a return yoke (shield yoke) 32 and an exciting coil 33. The read head 40 is located on the leading side of the write head 30, and has a structure in which a giant magnetoresistive (GMR) element 42 is formed between a pair of shields 41.

As shown in FIG. 1, the pinning layer 12 is formed below the soft underlayer 13, and the magnetization of the soft underlayer 13 is fixed by using the exchange coupling, thereby avoiding the formation of magnetic walls and preventing the generation of spike noise. When a magnetic field is applied to the pinning layer and soft underlayer and then the magnetic field is removed, if the magnetizations in these layers return to their respective original states, it can be said that no magnetization deviation occurs. In the present invention, if the magnetizations in the pinning layer and soft underlayer completely return to their original states when the applied magnetic field is removed, it is to be defined as a magnetization recovery ratio of unity. Also, a maximum applied magnetic field by which these layers ensure the magnetization recovery ratio of unity is defined as a magnetization recoverable magnetic field $H_{exf}$.

As described above, in the perpendicular recording magnetic disk apparatus, a magnetic field applied by the write head to the pinning layer may cause the magnetization in the soft underlayer to deviate from the predetermined direction. In the present invention, magnetization deviation in the soft underlayer can be prevented by satisfying a relationship that the magnetization recoverable magnetic field $H_{exf}$ is larger than an in-plane magnetic field applied by the write head to the pinning layer.

The in-plane magnetic field $H_h$, therefore, applied by the write head to the pinning layer will be discussed below.

One possible factor which affects the magnetic field $H_h$ is the thickness t (nm) of the soft underlayer. That is, the smaller the thickness t of the soft underlayer, the smaller the distance between the write head and pinning layer, i.e., the smaller the magnetic spacing, which results in increase of the magnetic field from the write head.

Using a write head having a track width $T_w$ of the main pole of 0.16 μm, a dimension PT in the head tracking direction of the main pole of 0.2 μm, a saturation flux density B of the main pole of 2.3 T, and a gap G of 0.1 μm, a field strength applied to a magnetic disk having a soft underlayer with a thickness t when data is written to the magnetic disk has been determined by simulation.

Figure 2A:
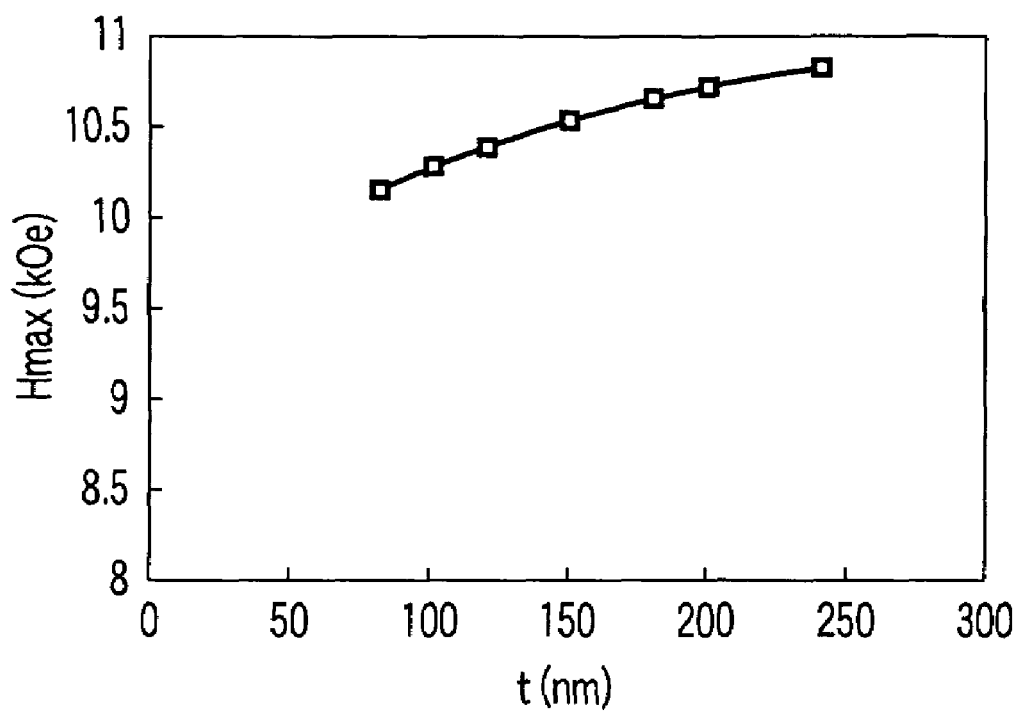
FIG. 2A is a graph showing the relationship between the thickness t of a soft underlayer and a magnetic field $H_{max}$ applied to the center of a recording layer.
Figure 2B:
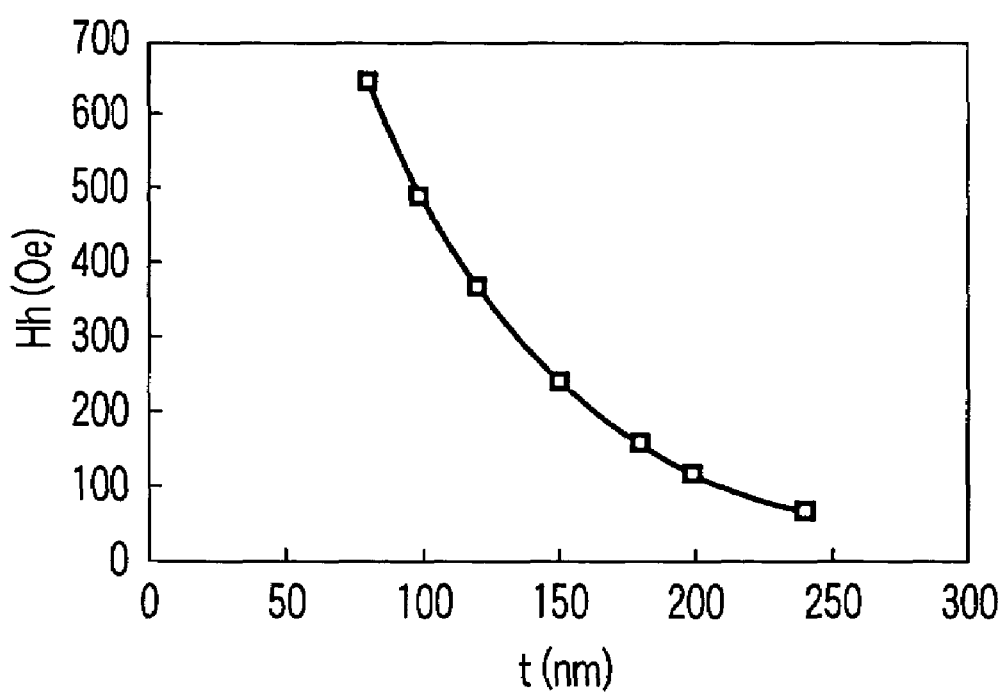
FIG. 2B is a graph showing the relationship between the thickness t of the soft underlayer and a in-plane magnetic field $H_h$ applied to a pinning layer.

FIG. 2A shows the relationship between the thickness t of the soft underlayer and the magnetic field $H_{max}$ applied to the center of the recording layer. FIG. 2B shows the relationship between the thickness t of the soft underlayer and the in-plane magnetic field $H_h$ applied to the pinning layer.

As shown in FIG. 2B, when the thickness t of the soft underlayer decreases, the in-plane magnetic field $H_h$ applied by the write head to the pinning layer increases significantly. For example, when the thickness t of the soft underlayer is 80 nm, the magnetic field $H_h$ is about 650 Oe. When a magnetic head having the above size is used, therefore, a magnetic disk in which the thickness t of the soft underlayer is 80 nm must have a magnetization recoverable magnetic field $H_{exf}$ of 650 Oe or more.

Another possible factor which affects the magnetic field $H_h$ is the size of the main pole, e.g., the track width $T_w$ of the main pole. That is, the smaller the track width $T_w$ of the main pole, the smaller the magnetic field $H_h$ applied to the pinning layer.

Using a write head having a dimension PT in the head tracking direction of the main pole of 0.2 μm, a saturation flux density B of the main pole of 2.3 T, and a gap G of 0.1 μm, a field strength applied to a magnetic disk having a soft underlayer with a thickness t of 80 nm when data is written to the magnetic disk has been determined by simulation.

FIG. 3A shows the relationship between the track width $T_w$ of the main pole and the magnetic field $H_{max}$ applied to the center of the recording layer. FIG. 3B shows the relationship between the track width $T_w$ of the main pole and the in-plane magnetic field $H_h$ applied to the pinning layer. For example, when the track width $T_w$ of the main pole is reduced to 0.12 μm, the magnetic field $H_h$ applied to the magnetic disk having the soft underlayer with the thickness t of 80 nm is about 610 Oe, which is smaller than that shown in FIG. 2B, where $T_w$ is 0.16 μm. Accordingly, this magnetic disk apparatus need only have a magnetization recoverable magnetic field $H_{exf}$ of 610 Oe or more.

From the results shown in FIGS. 2A to 3B, the relationship between the magnetic field $H_{max}$ applied to the center of the recording layer, the track width $T_w$ (μm) of the main pole, the dimension PT (μm) in the head tracking direction of the main pole, the saturation flux density B (T) of the main pole, the thickness t (nm) of the soft underlayer, and the magnetic field $H_h$ applied by the magnetic head to the pinning layer is represented by the following formulas:

$$H_{max}=((0.264*\log(t)+2.77)*B-0.09)*\exp(3.48*PT*T_w),$$

$$H_h/H_{max}=201*\exp(-0.014*t), \text{ and}$$

$$H_h=(((0.264*\log(t)+2.77)*B-0.09)*\exp(3.48*PT*T_w))*(201*\exp(-0.014*t)).$$

Accordingly, if the magnetization recoverable magnetic field $H_{exf}$ satisfies the following formula, magnetization deviation in the soft underlayer can be prevented against the in-plane magnetic field applied by the write head to the pinning layer:

$$H_{exf} > (((0.264 * \log(k) + 2.77) * B - 0.09) * \exp(3.48 * PT * T_w)) * (201 * \exp(-0.014 * t)).$$

In order to increase the magnetization recoverable magnetic field $H_{exf}$, it is conceivable to increase the thickness of the pinning layer or to use a material having high magnetic anisotropy as the pinning layer. Magnetization deviation in the soft underlayer may also be suppressed by appropriately weakening the exchange coupling force between the pinning layer and soft underlayer by adding, between the pinning layer and soft underlayer, a magnetic intermediate layer having saturation magnetization lower than that of the pinning layer.

Figure 4:
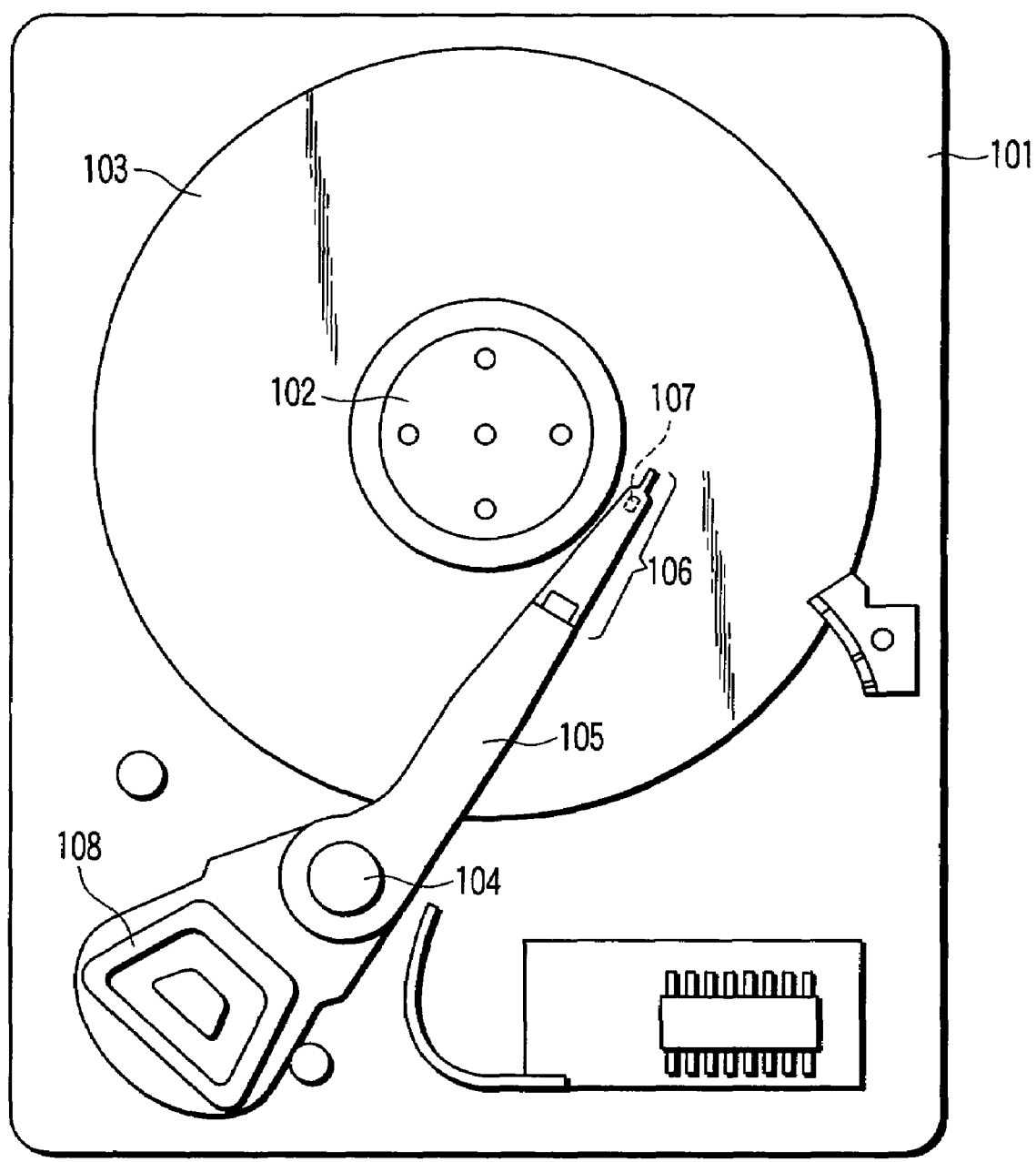
FIG. 4 is a plan view of the perpendicular magnetic disk apparatus according to an embodiment of the present invention.

FIG. 4 is a plan view of the perpendicular magnetic disk apparatus according to an embodiment of the present invention. A magnetic disk 103 is rotatably attached to a damper 102 of a spindle motor mounted on a base 101. An arm 105 is supported by a pivot 104 located near the magnetic disk 103. A suspension 106 is attached to the distal end of the arm 105, and a slider and a head 107 are attached on the air-bearing surface of the distal end of the suspension 106. A voice coil motor (VCM) 108 is located on the proximal end side of the arm 105. The VCM 108 has a driving coil wound around a bobbin, and a permanent magnet and a counter yoke which oppose each other on the two sides of the driving coil. Supplying a current to the driving coil of the VCM 108 rotates the arm about the pivot 104.

In the present invention, to ensure a magnetization recovery ratio of 1 of the pinning layer and soft underlayer, it is preferable to take into account a magnetic field $H_v$ applied by the VCM to the pinning layer, in addition to the magnetic field $H_h$ applied by the write head to the pinning layer. As the magnetic field $H_v$, it is sufficient to take account of a magnetic field applied to the pinning layer in a data region positioned on the outermost periphery of the magnetic disk which is closest to the VCM. As the magnetic field $H_v$ applied by the VCM to the pinning layer, a value measured by a Gauss meter placed in the vicinity of the outermost periphery of the magnetic disk can be used.

In the present invention, the magnetization recoverable magnetic field $H_{exf}$ is preferably larger than the total of the magnetic field $H_h$ applied by the write head to the pinning layer and the magnetic field $H_v$ applied by the VCM to the pinning layer, i.e., $H_{exf} > H_h + H_v$ preferably holds. Accordingly, it is preferable to satisfy the following formula:

$$H_{exf} > (((0.264 * \log(k) + 2.77) * B - 0.09) * \exp(3.48 * PT * T_w)) * (201 * \exp(-0.014 * t)) + H_v.$$

The results of evaluation of magnetic disk apparatuses manufactured by using a plurality of magnetic disks different in value of the magnetization recoverable magnetic field $H_{exf}$ will be explained below. The evaluation was performed by using a write head having a track width $H_w$ of the main pole of 0.2 µm, a dimension PT in the head tracking direction of the main pole of 0.2 µm, and a saturation flux density B of the main pole of 2.15 T. Magnetic disk apparatuses were manufactured by using two types of magnetic disk each having a soft underlayer with a thickness t of 120 nm, and having a magnetization recoverable magnetic field $H_{exf}$ of 250 and 500 Oe. In each apparatus, the magnetic field $H_v$ applied by the VCM to the pinning layer in the data region on the outermost periphery was 60 Oe. Also, the magnetic field $H_h$ applied by the magnetic head to the pinning layer, which was calculated from the above formula, was 274 Oe. Therefore, the signal quality is presumably degraded if the magnetization recoverable magnetic field $H_{exf}$ is 334 Oe or more.

In effect, spike noise was found in the magnetic disk apparatus using the magnetic disk with the magnetization recoverable magnetic field $H_{exf}$ of 250 Oe. This indicates that magnetization deviation occurred in the soft underlayer. An optical surface analyzer (OSA) image of the magnetic disk in which the magnetization deviation occurred was checked. As a result, magnetic walls in substantially the radial direction were found in two portions of the disk. No data was obtained in those portions where the magnetic walls were formed. Especially in a region where the magnetic wall extended to a servo area, the apparatus could not operate because of servo signal loss.

In contrast, in the magnetic disk apparatus using the magnetic disk with $H_{exf}$ of 500 Oe, no spike noise was found, indicating that no magnetization deviation was produced. In addition, no trouble was caused by data loss or servo loss, and the apparatus operated without problem.

The results of evaluation of magnetic disk apparatuses manufactured by using a plurality of magnetic disks having the same value of the magnetization recoverable magnetic field $H_{exf}$ but different in thickness t of the soft underlayer will be explained below. As in the above evaluation, the evaluation was performed by using a write head having a track width $T_w$ of the main pole of 0.2 µm, a dimension PT in the head tracking direction of the main pole of 0.2 µm and a saturation flux density B of the main pole of 2.15 T. Also, the magnetic disk apparatuses were manufactured by using three types of magnetic disks having a soft underlayer whose thickness t was 120, 150, and 180 nm, respectively, and the magnetization recoverable magnetic field $H_{exf}$ was commonly 300 Oe. In each apparatus, the magnetic field $H_v$ applied by the VCM to the pinning layer in the data region on the outermost periphery was 60 Oe. Also, the magnetic fields $H_h$ applied by the magnetic head to the pinning layer, which were calculated from the above formula, were 275 Oe (for t=120 nm), 182 Oe (for t=150 nm) and 120 Oe (for t=180 nm), respectively. Therefore, the signal quality is presumably degraded if the magnetization recoverable magnetic fields $H_{exf}$ are 315 Oe or more (t=120 nm), 242 Oe or more (t=150 nm), and 180 Oe or more (t=180 nm) for respective apparatuses.

In effect, spike noise was found in the magnetic disk apparatus using the magnetic disk having the soft underlayer with the thickness t of 120 nm. Consequently, no data was obtained, or the apparatus could not operate because of servo signal loss.

In contrast, in the magnetic disk apparatus using the magnetic disk having the soft underlayer whose thickness t was 150 or 180 nm, no spike noise was found, so no trouble was caused by data loss or servo loss, and the apparatus operated without problem.

Furthermore, an external magnetic field may be applied to a magnetic disk apparatus in addition to the magnetic field $H_h$ applied by the write head to the pinning layer and the magnetic field $H_v$ applied by the VCM to the pinning layer. Especially when the magnetic disk apparatus is used for mobile purposes, the influence of the external magnetic field must be taken into account. If the external magnetic field is $H_t$, it is preferable that the magnetization recoverable magnetic field satisfies the following relationship: $H_{exf} > H_h + H_v + H_t$, in order to keep a magnetization recovery ratio of 1 with preventing from magnetization deviation.

As in the above evaluation, the evaluation was performed by using a write head having a track width $T_w$ of the main pole of 0.2 µm, a dimension PT in the head tracking direction of the main pole of 0.2 µm and a saturation flux density B of the main pole of 2.15 T. A magnetic disk apparatus was manufactured by using a magnetic disk having a soft underlayer with a thicknesses t of 150 nm and a magnetization recoverable magnetic field $H_{exf}$ of 400 Oe. The magnetic field $H_v$ applied by the VCM to the pinning layer in the data region on the outermost periphery was 60 Oe. Also, the magnetic field $H_h$ applied by the magnetic head to the pinning layer, which was calculated from the above formula, was 182 Oe.

External magnetic fields of 50, 100, 150, 200, and 250 Oe were applied from a position above the magnetic disk apparatus. As a result, when the external magnetic field was 200 Oe or less, no spike noise was found, indicating that no magnetization deviation occurred. Also, no trouble was caused by data loss or servo loss, and the apparatus operated without problem. However, when the external magnetic field of 250 Oe was applied, spike noise was found, indicating that magnetization deviation occurred in the soft underlayer.

The GMR element used in the read head increases the read distortion and the bit error rate (BER) when an external magnetic field is applied. An allowable external magnetic field is also defined from this standpoint.

Figure 5A:
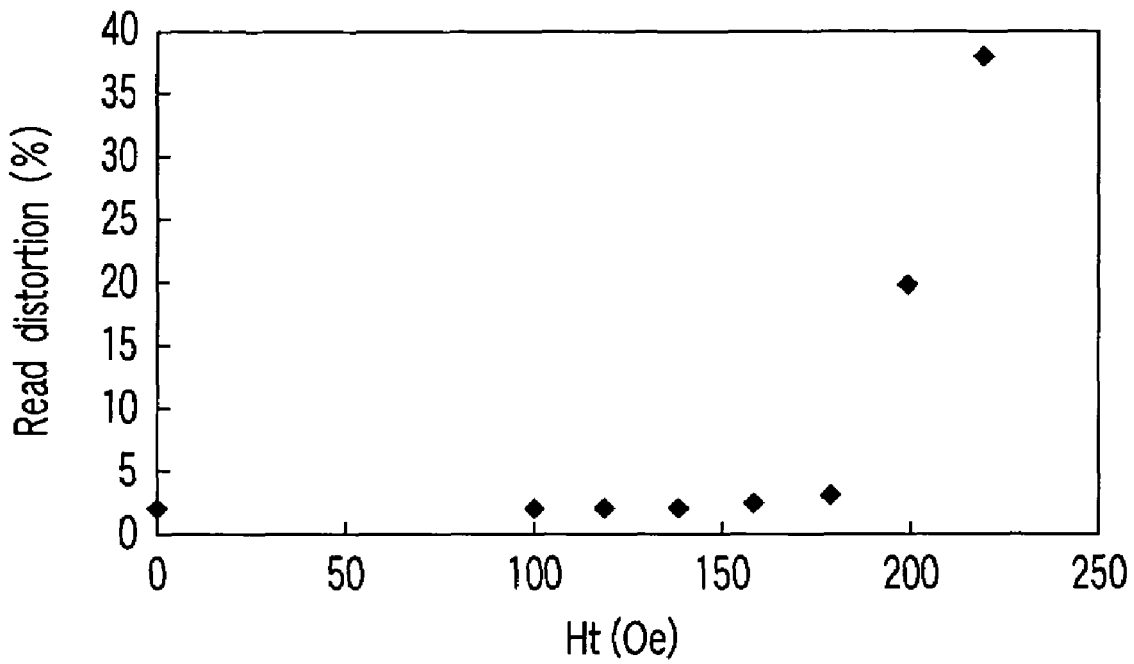
FIG. 5A is a graph showing the relationship between an external magnetic field and read distortion.
Figure 5B:
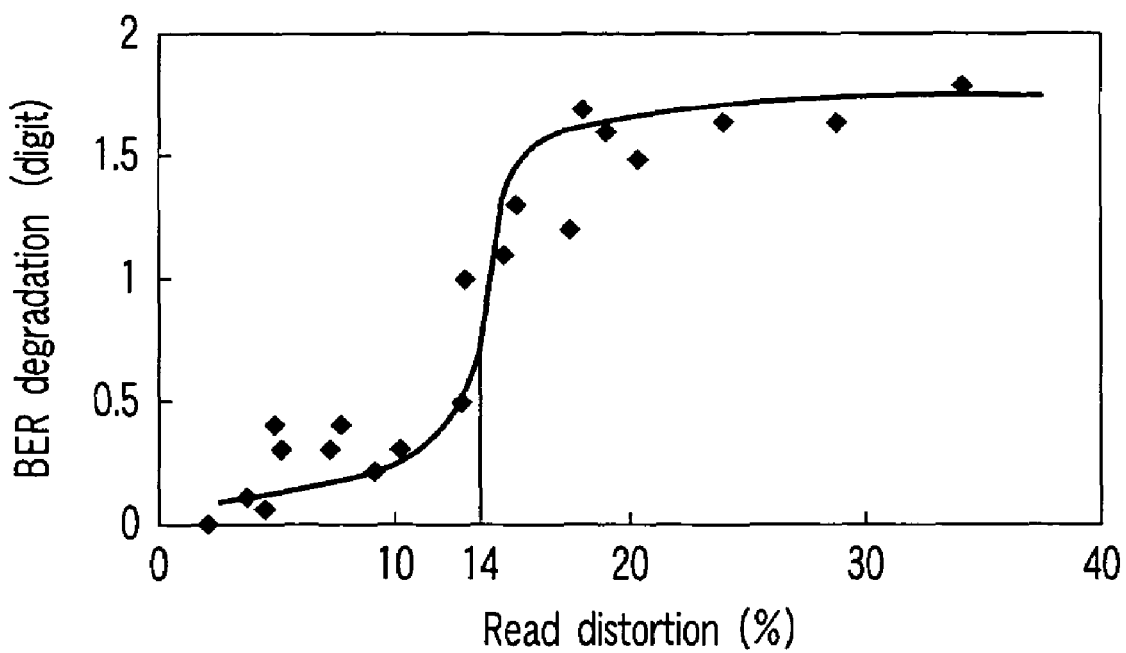
FIG. 5B is a graph showing the relationship between the read distortion and the bit error rate BER.

FIG. 5A shows the relationship between the external magnetic field and read distortion. From FIG. 5A, the read distortion exceeds 15% when the external magnetic field is 200 Oe or more. FIG. 5B shows the relationship between the read distortion and BER. From FIG. 5B, when the read distortion exceeds 15%, the BER become −0.8 orders of magnitude smaller than that when there is no read distortion. From these results, in order to avoid degradation of the BER, the external magnetic field is desirably 200 Oe or less. Accordingly, the magnetization recoverable magnetic field $H_{exf}$ preferably satisfies the relationship represented by the following formula:

$$H_{exf} \geq (((0.264*\log(t)+2.77)*B-0.09)*\exp(3.48*PT*T_w))*(201*\exp(-0.014*t))+H_v+200.$$

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A perpendicular recording magnetic disk apparatus comprising:
   a perpendicular two-layered medium comprising a pinning layer, a soft underlayer and a perpendicular recording layer; and
   a write head comprising a main pole, a return yoke and an exciting coil,
   wherein, given that $T_w$ is a track width (in µm) of the main pole, PT is a dimension (in µm) in a head tracking direction of the main pole, B (T) is a saturation flux density of the main pole, and t is a thickness (in nm) of the soft underlayer, a magnetization recoverable magnetic field $H_{exf}$ satisfies a relationship represented by the following formula:

$$H_{exf} \geq (((0.264*\log(t)+2.77)*B-0.09)*\exp(3.48*PT*T_w))*(201*\exp(-0.014*t)).$$

2. The apparatus according to claim 1, wherein, given that $H_v$ is a magnetic field applied by a voice coil motor to the pinning layer on an outermost periphery of the perpendicular two-layered medium, the magnetization recoverable magnetic field $H_{exf}$ satisfies a relationship represented by the following formula:

$$H_{exf} \geq (((0.264*\log(t)2.77)*B-0.09)*\exp(3.48*PT*T_w))*(201*\exp(-0.014*t))+H_v.$$

3. The apparatus according to claim 2, wherein, given that maximum external magnetic field is 200 (Oe), the magnetization recoverable magnetic field $H_{exf}$ satisfies a relationship represented by the following formula:

$$H_{exf} \geq (((0.264*\log(t)+2.77)*B-0.09)*\exp(3.48*PT*T_w))*(201*\exp(-0.014*t))+H_v+200.$$

4. The apparatus according to claim 1, wherein the thickness of the soft underlayer is 150 nm or less.

* * * * *